US011304276B2

(12) United States Patent
Nava et al.

(10) Patent No.: US 11,304,276 B2
(45) Date of Patent: Apr. 12, 2022

(54) GLARE-REACTIVE LIGHTING APPARATUS

(71) Applicant: IDEAL Industries Lighting LLC, Sycamore, IL (US)

(72) Inventors: Dante P. Nava, Morrisville, NC (US); Joshua J. Markle, Raleigh, NC (US); Robert E. Higley, Cary, NC (US); Edward Steinke, Raleigh, NC (US)

(73) Assignee: IDEAL INDUSTRIES LIGHTING LLC, Sycamore, IL (US)

( * ) Notice: Subject to any disclaimer, the term of this patent is extended or adjusted under 35 U.S.C. 154(b) by 505 days.

(21) Appl. No.: 13/777,804

(22) Filed: Feb. 26, 2013

(65) Prior Publication Data

US 2014/0239808 A1 Aug. 28, 2014

(51) Int. Cl.
*H05B 45/20* (2020.01)
*H05B 47/11* (2020.01)
*H05B 47/105* (2020.01)

(52) U.S. Cl.
CPC .......... *H05B 45/20* (2020.01); *H05B 47/105* (2020.01); *H05B 47/11* (2020.01); *Y02B 20/40* (2013.01)

(58) Field of Classification Search
CPC ...... H05B 45/20; H05B 47/105; H05B 47/11; Y02B 20/40
USPC ...................................... 315/77–82, 149–153
See application file for complete search history.

(56) References Cited

U.S. PATENT DOCUMENTS 6,936,968 B2 8/2005 Cross et al.
7,507,001 B2 3/2009 Kit
2004/0143380 A1 7/2004 Stam et al.
2005/0002103 A1* 1/2005 Bechtel ................ B60Q 1/1423
 359/604
2007/0295891 A1* 12/2007 Wang ...................... F42C 13/02
 250/221
2008/0266849 A1 10/2008 Nielson et al.
2009/0160363 A1 6/2009 Negley et al.
(Continued)

FOREIGN PATENT DOCUMENTS

JP 2 921404 B2 7/1999
WO WO 2006/056814 A1 6/2006
(Continued)

OTHER PUBLICATIONS

International Search Report and Written Opinion, PCT/UX14/17951, dated Apr. 12, 2014.
(Continued)

*Primary Examiner* — Roberto W Flores
(74) *Attorney, Agent, or Firm* — Withrow & Terranova, P.L.L.C.

(57) ABSTRACT

A system includes at least one lighting device, e.g., at least one LED luminaire, and a control circuit configured to control a spectral output produced by the at least one lighting device responsive to environmental information about an area illuminated by the at least one lighting device. The control circuit may be configured to control a color temperature of the illumination responsive to the environmental information. In some embodiments, the control circuit may be configured to lower the color temperature of the illumination responsive to the environmental information indicating a level of reflected light and/or a weather condition, such as precipitation, correlated with the presence or likely presence of glare.

16 Claims, 6 Drawing Sheets

(56) References Cited

U.S. PATENT DOCUMENTS

| | | | |
|---|---|---|---|
| 2010/0164384 A1* | 7/2010 | Ku et al. | 315/117 |
| 2011/0169410 A1* | 7/2011 | Dassanayake et al. | 315/82 |
| 2011/0291564 A1* | 12/2011 | Huang | F21V 23/0457 |
| | | | 315/77 |
| 2012/0032594 A1* | 2/2012 | Hagner | 315/82 |
| 2012/0268034 A1 | 10/2012 | Karasawa et al. | |
| 2012/0299476 A1* | 11/2012 | Roberts | B60Q 1/0011 |
| | | | 315/77 |
| 2012/0306375 A1 | 12/2012 | van de Ven | |
| 2013/0147368 A1* | 6/2013 | McCavit et al. | 315/159 |
| 2014/0191682 A1 | 7/2014 | Pederson | |

FOREIGN PATENT DOCUMENTS

| | | |
|---|---|---|
| WO | WO 2009/059464 A1 | 5/2009 |
| WO | WO 2012/048436 A1 | 4/2012 |

OTHER PUBLICATIONS

International Preliminary Report on Patentability, PCT/US2014/017951, dated Sep. 1, 2015.
European Search Report Corresponding to European Application No. 14 75 7376; dated Sep. 9, 2016; 8 Pages.

* cited by examiner

GLARE-REACTIVE LIGHTING APPARATUS

FIELD

The inventive subject matter relates to lighting apparatus and methods and, more particularly, to solid-state lighting apparatus and methods.

BACKGROUND

Solid-state lighting arrays are used for a number of lighting applications. For example, solid-state lighting panels including arrays of solid-state light emitting devices have been used as direct illumination sources in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting devices are often used in lighting fixtures, such as incandescent bulb replacement applications, task lighting, recessed light fixtures and the like. For example, Cree, Inc. produces a variety of light fixtures that use LEDs for illumination. The fixtures include can-type down lights, such as the LR-6 and CR-6, and troffer-type fixtures, such as the CR-24.

Solid state lighting devices are commonly used in outdoor applications, such as lighting for streets, sidewalks, parking lots, parking garages and the like. For example, Cree, Inc. produces a variety of outdoor LED luminaires, which include luminaires for street lighting, open structure (e.g., parking garage) lighting and similar purposes, such as THE EDGE series of pole-mountable and structure-mountable luminaires.

SUMMARY

Some embodiments provide a system including at least one lighting device and a control circuit configured to control a spectral output produced by the at least one lighting device responsive to environmental information about an area illuminated by the at least one lighting device. The control circuit may be configured to control a color temperature of the illumination responsive to the environmental information. In some embodiments, the control circuit may be configured to lower the color temperature of the illumination responsive to the environmental information indicating a condition causing glare. In further embodiments, the control circuit may be configured to lower the color temperature of the illumination responsive to the environmental information indicating precipitation.

According to some embodiments, the environmental information may include reflected light information and/or weather information. The environmental information may be provided by at least one environmental sensor positioned proximate the at least one lighting device. The at least one environmental sensor may include, for example, at least one light sensor and/or at least one weather sensor. In some embodiments, the environmental information may be provided by a weather monitoring system.

In some embodiments, the at least one lighting device may include at least one outdoor luminaire. In further embodiments, the at least one lighting device may include a headlight of a vehicle and the environmental information may be provided by at least one environmental sensor positioned on the vehicle. The at least one lighting device ma include at least one LED lighting device.

Further embodiments provide a system including at least one LED luminaire, at least one environmental sensor configured to sense a glare-correlated environmental characteristic of an area illuminated by the at least one LED luminaire and a control circuit operatively coupled to the at least one LED luminaire and to the at least one environmental sensor and configured to control a color temperature of illumination produced by the at least one LED luminaire responsive to the sensed environmental characteristic. In some embodiments, the at least one environmental sensor may include at least one reflected light sensor. In further embodiments, the at least one environmental sensor may include at least one weather sensor, such as a precipitation sensor.

In some embodiments, the at least one environmental sensor may be positioned on a structure that supports the at least one LED luminaire. In some embodiments, the at least one LED luminaire may include a plurality of spaced-apart LED luminaires, and the at least one environmental sensor may include at least one environmental sensor configured to sense a glare-correlated environmental characteristic of an area collectively illuminated by the plurality of LED luminaires. The control circuit may be operatively coupled to the plurality of LED luminaires and configured to collectively control a color temperature of illumination produced by the plurality of LED luminaires.

Some embodiments provide methods of operating a lighting system. The methods may include providing glare-correlated environmental information pertaining to an area illuminated by the lighting system and controlling a spectral output of at least one lighting device of the lighting system responsive to the glare-correlated environmental information.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
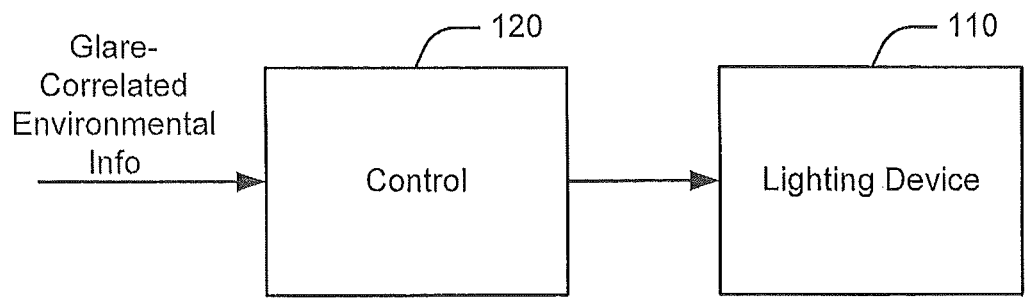
FIG. 1 illustrates a lighting system according to some embodiments.

Embodiments of the inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be further understood that elements "coupled in series" or "serially connected" may be directly coupled or may be coupled via intervening elements.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device. The inventive subject matter may further relate to an illuminated enclosure (the volume of which can be illuminated uniformly or non-uniformly), including an enclosed space and at least one lighting apparatus according to the inventive subject matter, wherein the lighting apparatus illuminates at least a portion of the enclosed space (uniformly or non-uniformly).

Some embodiments of the inventive subject matter arise from a realization that reduced glare from light sources, such as street lamps and other forms of outdoor lighting, may be achieved by varying a spectral output of the light sources responsive to glare-correlated environmental information. For example, in some embodiments, the correlated color temperature (CCT) of light produced by an outdoor lighting device, such as a pole-mounted street light, may be varied responsive to sensors that sense reflected light intensity and/or weather conditions that are correlated with increased glare, such as rain, snow or other forms of precipitation. In some embodiments, control of spectral output (e.g., CCT) may be combined with control of other light output parameters, such as color rendering index (CRI), lumen output (dimming), and the like. Spectral control may be dependent on some or all of these other parameters, e.g., a different color control may be applied based on the lumen output (dimming level) of the lighting apparatus and/or the desired CRI for the environment (e.g., street vs. parking garage). Some embodiments may be advantageously implemented in a solid-state lighting device, such as an LED luminaire, which may have the capability to control its spectral output by adjusting relative contributions of various color components of the light it produces.

FIG. 1 illustrates a lighting apparatus 100 according to some embodiments of the inventive subject matter. The lighting apparatus 100 includes at least one lighting device 110, which may include, for example, one or more luminaires used to illuminate an area that is subject to intermittent environmental conditions that produce undesirable glare, such as glare produced by wet or iced surfaces. The area may include, for example, an open space, such as a roadway, street, sidewalk or the like, or an area partially enclosed by an open structure, such as a parking garage, pavilion or the like. A control circuit 120 is configured to receive glare-correlated environmental information relating to the area illuminated by the lighting device 110. The glare-correlated environmental information may include, but is not limited to, information relating to reflected light in the illuminated area and/or weather information pertaining to the illuminated area, such as information from one or more precipitation sensors and/or from a weather monitoring system that provides information pertaining to precipitation or other factors that may affect the amount of glare produced by the lighting device.

As noted above, the glare-correlated environmental information in some embodiments may be provided from one or more optical sensors. For example, in some embodiments, a light intensity sensor may be positioned to receive reflected light from a surface likely to cause glare, such as a roadway or parking lot surface, and the intensity of light detected from such a sensor may be used to provide a measure of glare that may be experienced in the environment proximate the surface. In some embodiments, such sensors may include one or more sensors positioned to measure a direct reflection from a subject surface, such as a roadway or parking lot, and/or one or more sensors configured to measure light reflected at particular angles that correspond to common viewing angles of subjects, such as drivers or pedestrians, such that the measurements may more closely correspond to glare perceived by such subjects. Differential measures of glare may also be used, for example, by comparing a signal generated by a light sensor focused on a subject surface (e.g., a roadway or parking lot) to a signal from a light sensor focused on a "control" surface that is not subject to glare-inducing conditions, such as rain or ice, a signal generated by a light sensor that is optically filtered (e.g., using a polarizing lens or filter) to attenuate glare components, and/or glare reference signal from some other source.

Glare may be measured in a number of different ways. Metrics for effect of glare on human subjects include disability glare and discomfort glare, and these may be calculated in any of a number of different ways. The effect of glare may depend, for example, on the size of the source, the contrast between the background light and glare source, and physical characteristics of the viewer.

In some embodiments, glare may be measured, for example, from luminance (e.g., candelas per square meter). There are measuring instruments that can provide a direct measurement of luminance, or other devices, such as digital cameras, may be used to generate luminance measurements. For example, a relative measure of luminance may be gained by comparing a raw digital camera image to a reference image.

CIE Standard 150:2003 defines a method of measuring the glare produced by a distant light source by measuring the intensity of a luminous source. An illuminance meter (luxmeter) may be used for such a measurement. For example, in some embodiments, a distance to a surface identified as a potential source of glare (e.g., a road surface) may be known, allowing an illuminance meter (luxmeter) to be used to generate a glare measurement using the CIE technique.

Glare measurements may be complicated by the presence of multiple sources of light. In some embodiments, the luminous intensity produced by a particular source of light (e.g., a particular streetlight) may be measured by using a luxmeter or other illuminance sensor that is focused on a particular location using lenses, hoods or other optical devices that restrict input from other light sources to the sensor. Some embodiments may use digital images which can be processed to identify illuminance coming from particular sources based on the location within the digital image. Data from such sensors may be compared to reference sensor values or images and/or to data from other sensors that are configured to measure ambient light.

It will be appreciated that the control circuit 120 may be implemented in a number of different ways. In general, it will be appreciated that the control circuit 120 may be implemented using analog circuitry, digital circuitry and/or a combination thereof. For example, the control circuit 120 may be relatively simply analog or digital control circuit that provides, for example, a limited number of different spectral output for different conditions indicated by the glare-correlated environmental information, or a more complex control circuit (e.g., including one or more microprocessors, microcontrollers and/or digital signal processors) that is capable of providing a more sophisticated control of spectral output based on such information. It will be appreciated that the control circuit 120 may be integrated with the at least one lighting device and/or may be remotely located with respect to the at least one lighting device 110 and coupled thereto via, for example, a wired or wireless communications channel.

Figure 2:
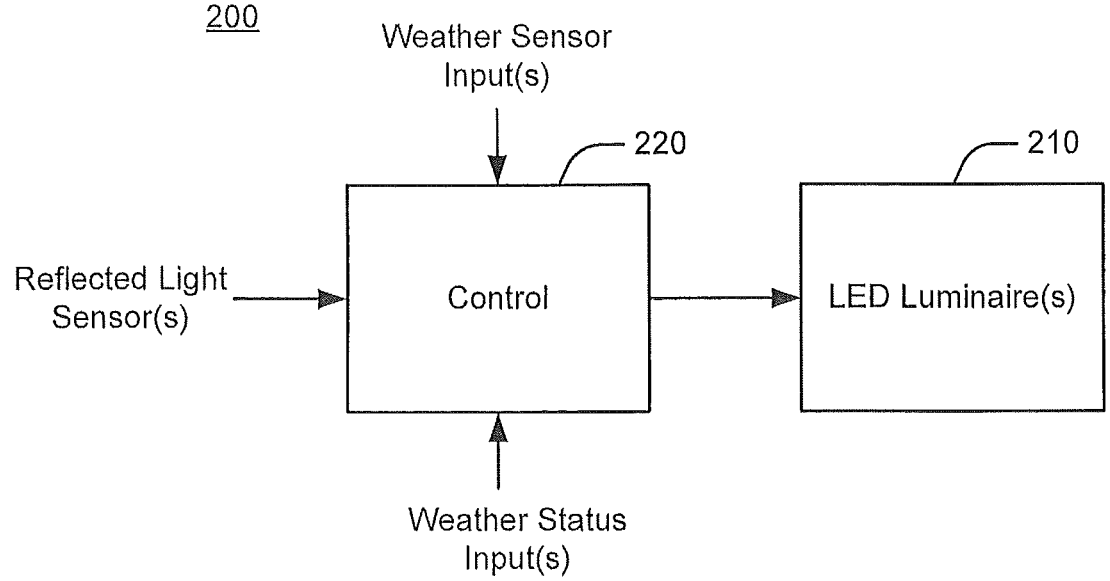
FIG. 2 illustrates an LED lighting system according to further embodiments.

FIG. 2 illustrates a lighting apparatus 200 with such capabilities according to some embodiments. The apparatus 200 includes at least one LED luminaire 210. The LED luminaire(s) may include, for example, one or more street lights or structure-mounted LED luminaires, such as the Cree, Inc. THE EDGE series of outdoor luminaires. The at least one LED luminaire 210 is controlled by a control circuit 220, which controls a color temperature or other spectral characteristic of light produced by the at least one LED luminaire responsive to glare-correlated environmental information, such as one or more inputs from reflected light sensors, one or more inputs from weather sensors, such as precipitation detectors, and/or weather status information from a weather reporting system or similar source. The control circuit 220 may be configured, for example, to reduce a color temperature of light produced by the at least one LED luminaire 210 when the input glare-correlated environmental information indicates a condition producing and/or likely to produce increased glare. The control circuit 220 may be further configured to control the CRI, lumen output and/or other characteristic of the light output of the at least one LED luminaire 210. The control of these additional output characteristics may be interdependent with the spectral control by the control circuit 220. For example, the spectral control provided by the control circuit 220 may be dependent on lumen output (dimming level) such that, for example, the control circuit 220 causes a greater or lesser change in spectral output for a given glare-correlated environmental information input depending on the current dimming level of the at least one LED luminaire 210.

Figure 3:
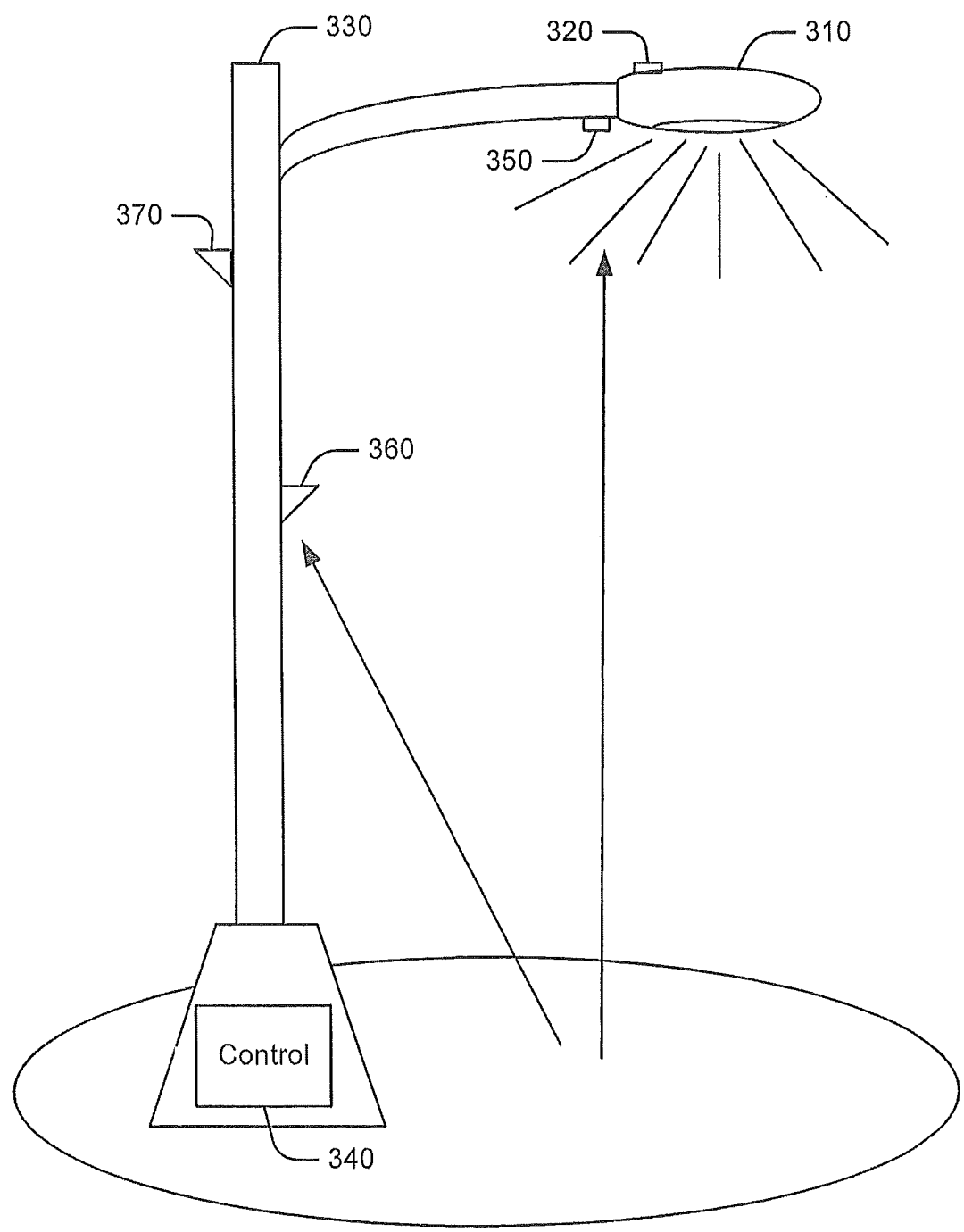
FIG. 3 illustrates a pole-mounted lighting system according to some embodiments.

FIG. 3 illustrates reactive glare control in a street lighting apparatus 300 according to some embodiments. The apparatus 300 includes an LED luminaire 310 mounted on a pole 330 and configured to illuminate an area 301. The apparatus 300 includes a control circuit 340, which is configured to control the luminaire 310. FIG. 3 shows the control circuit 340 as being positioned at a base of the pole 330 for purpose of illustration, but it will be appreciated that the control circuit 340 may be located elsewhere, for example, in the housing of the luminaire 310. The apparatus 300 further includes an upward-facing photosensor 320, which is configured to transmit a photosensor signal to the control circuit 340 indicating an ambient light level. The control circuit 340 may be configured, for example, to turn the luminaire 310 on and off based on the photosensor signal and/or to provide control of lumen output (dimming), CRI or other characteristics.

As further shown, the apparatus 300 may further include one or more additional light sensors 350, 360, which may produce signals indicating reflected light to the control circuit 340. For example, the additional light sensor(s) may include a light sensor 350 that face towards a surface of the area 301 illuminated by the luminaire 310, such that it detects light directly reflected back towards the luminaire 310. In place of or in addition to the direct reflection sensor 350, the apparatus may include a light sensor 360 configured to detect the light scattered at an angle with respect to the incident surface of the area 301. The intensity of this reflected light may provide a useful measure of light that may cause glare for drivers or pedestrians located in or near the illuminated area 301. As shown, the light sensor 360 may be mounted on the pole 330, but it will be appreciated that such a sensor may be mounted in a different location near the illuminated area 301 that is suited for detecting such angularly deflected light.

The control circuit 340 may be configured to control a color temperature of light produced by the luminaire 310 responsive to inputs from either or both of the reflected light sensors 350, 360. For example, if signals from either or both of the light sensors 350, 360 indicate an increase in detected reflected light intensity, the control circuit 340 may reduce the CCT of the light produced by the luminaire 310 in an attempt to reduce undesirable glare. In some embodiments, the control circuit 340 may analyze differences between light levels sensed by the differently-located light sensors 350, 360 to determine whether a glare-producing condition is present, and may control CCT of the light produced by the luminaire 310 accordingly. Additional sensors may be also be provided to serve as a reference for the sensors 350, 360, such as one or more sensors focused on a non-glare producing surface and/or optically filtered (e.g., using a polarizing filter) to remove glare components.

In some embodiments, for example, CCT may be controlled over a range from about 2100K to about 7000K. One portion of the CCT range (e.g., around 2100K to around 3500K) may be used, for example, in higher glare conditions. Such a setting may, for example, approximate the CCT of a typical high pressure sodium (HPS) lamp. Another portion of the CCT range (e.g., from about 4000K to about 7000K) may be used for lower glare conditions. Such a setting may, for example, approximate the CCT of a metal halide lamp.

As further shown, the apparatus 300 may also include one or more weather sensors 370. The weather sensor(s) 370 may include, for example, rain detectors, fog detectors or similar devices, which may generate signals indicative of weather conditions that are likely to create increased glare from the luminaire 310. The control circuit 340 may be configured to control the spectral output of the luminaire in response to such signals indicating conditions that potentially increase glare. The weather sensor(s) 370 may be used in place of or in conjunction with light sensors, such as the light sensors 350, 360.

Figure 4:
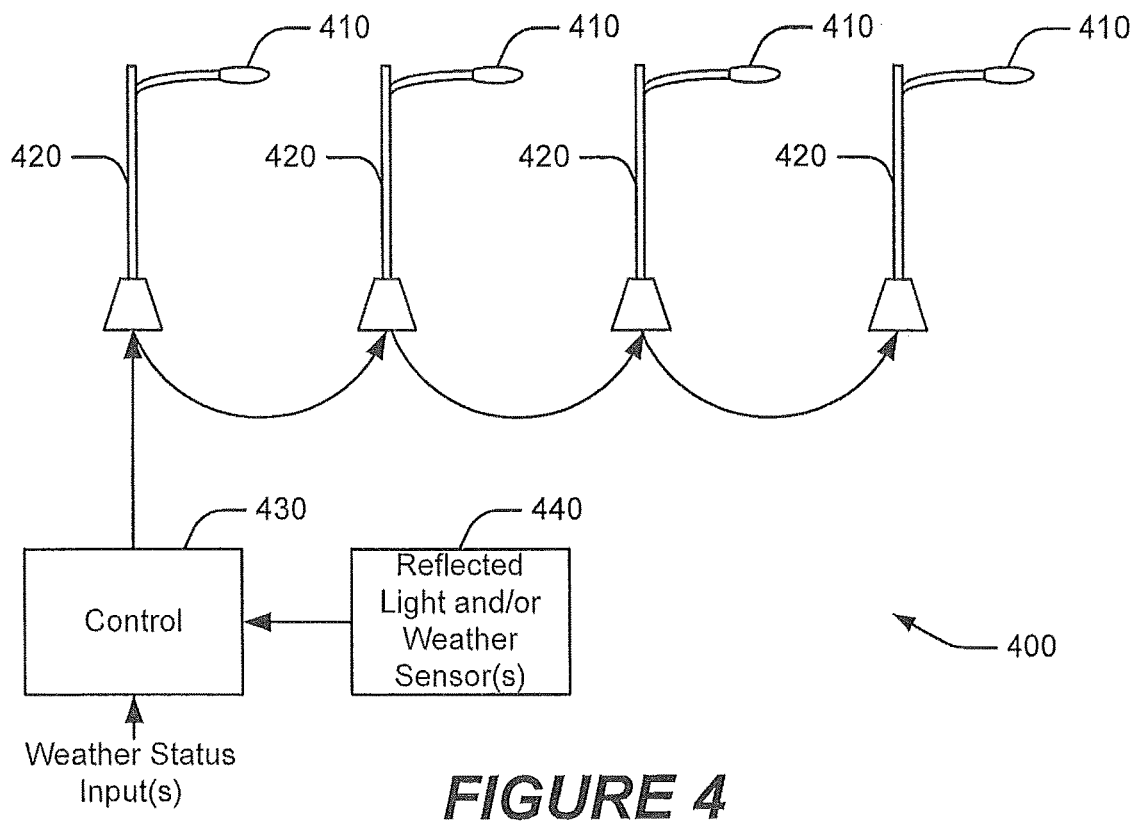
FIG. 4 illustrates a pole-mounted lighting system according to further embodiments.

In some embodiments, multiple lighting devices may be controlled by a common controller that provides spectral control. For example, referring to FIG. 4, a lighting system 400 may include a plurality of spaced apart LED luminaires 410 on respective poles 420, such as might be the case in a street light or parking light application. A common control circuit 430 may control CCT of the light produced by the luminaires 410 based on information received from one or more reflected light and/or weather sensors 440. The control circuit 430 may also control the CCT of the light produced by the luminaires 410 based on information from a weather information system, which may provide, for example, information pertaining to current or anticipated rain, snow or other glare-inducing weather conditions. If such information indicates precipitation, for example, the control circuit 430 may reduce the CCT of the light produced by the luminaires 410 to reduce the likelihood of undesirable levels of glare.

Figure 5:
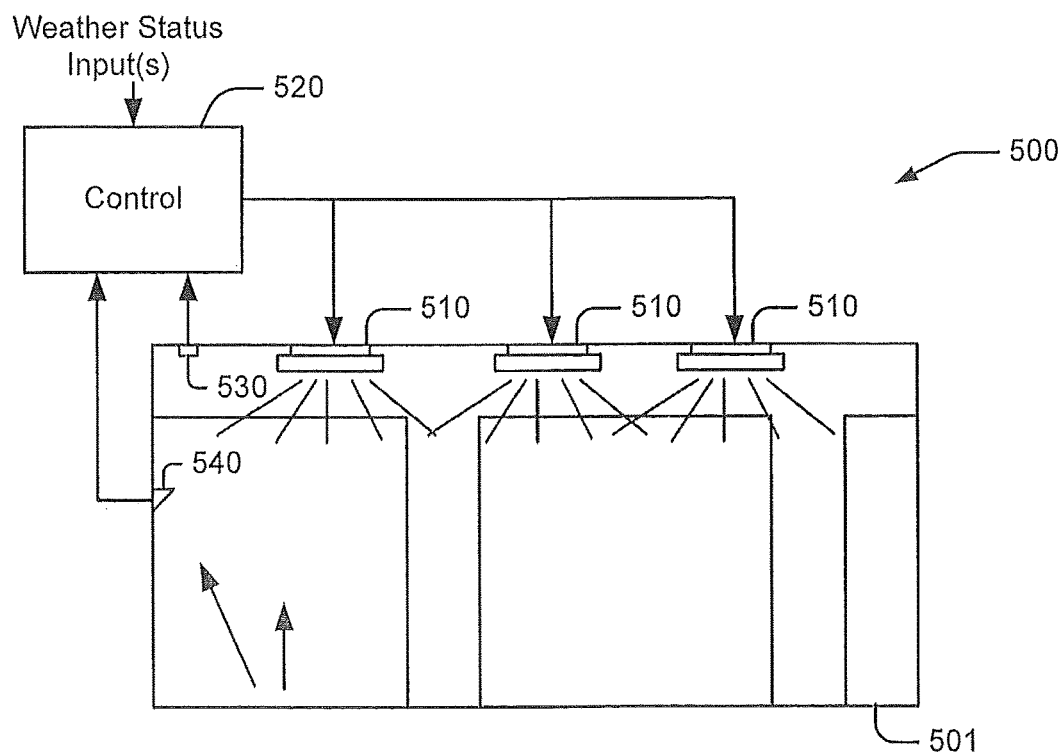
FIG. 5 illustrates a lighting system for a lighted space according to some embodiments.
Figure 6:
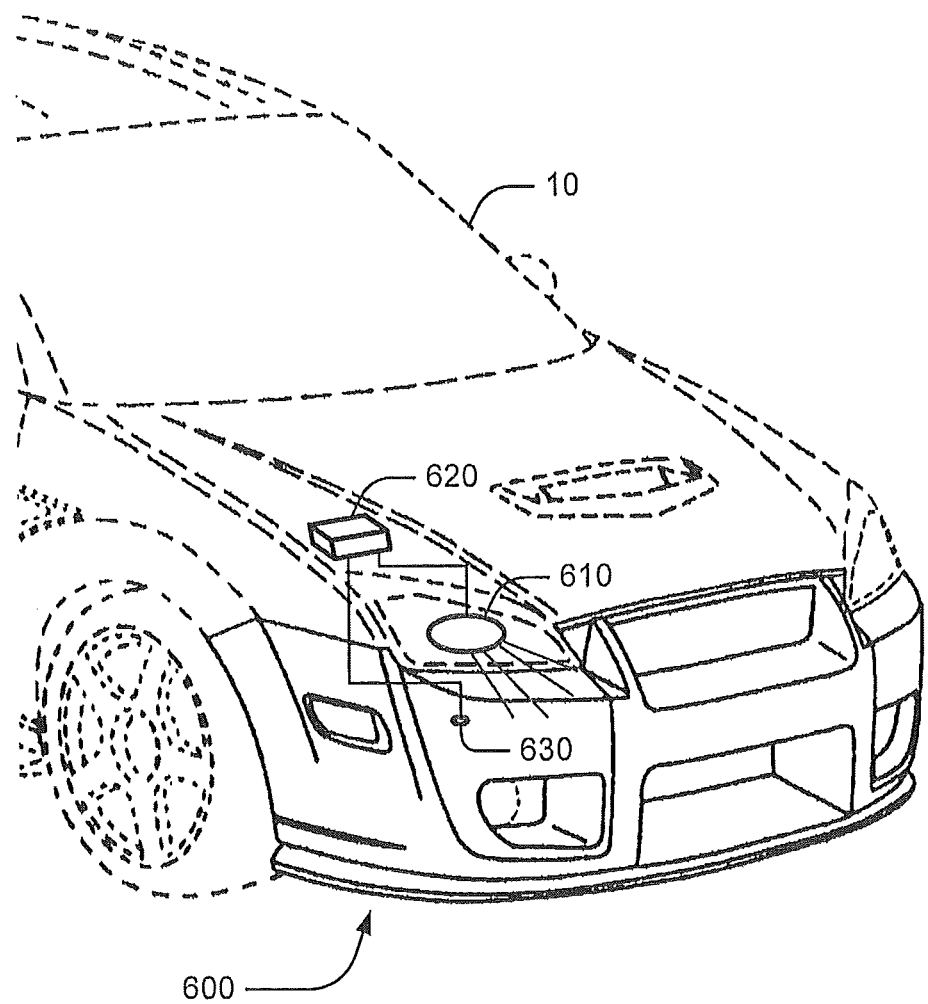
FIG. 6 illustrates an vehicle lighting application according to some embodiments.

Similar systems may be used in other outdoor lighting applications, such as in partially enclosed spaces such as parking garages, outdoor pavilions and the like. For example, FIG. 5 illustrates a lighting system 500 for a parking garage 501. The lighting system 500 includes a plurality of ceiling mounted luminaires 510, which are controlled by a common CCT control circuit 520. The CCT control circuit 520 may receive glare-correlated environmental information from locally positioned reflected light sensors 530, 540 and/or from weather sensors or other weather information inputs. The CCT control circuit 520 may be configured, for example, to detect when glare-inducing conditions, such as wet floor surfaces in the garage 501, are present and/or likely to be present, and may control the CCT of the light produced by the luminaires 510 accordingly.

Some embodiments of the inventive subject matter may be used in other applications. For example, in some embodiments, an vehicle 10 may include headlights 610 having a color temperature that may be controlled by an on-board CCT control circuit 620, which may receive, for example, reflected light information from a sensor 630 mounted on the vehicle 10. The vehicle 10 may also include weather sensors and/or a communication system configured to receive weather information that provides information about weather conditions that may lead to increased glare. The CCT control circuit 620 may be configured to control the color temperature of the light produced by the headlights 610 responsive to such information.

Figure 7:
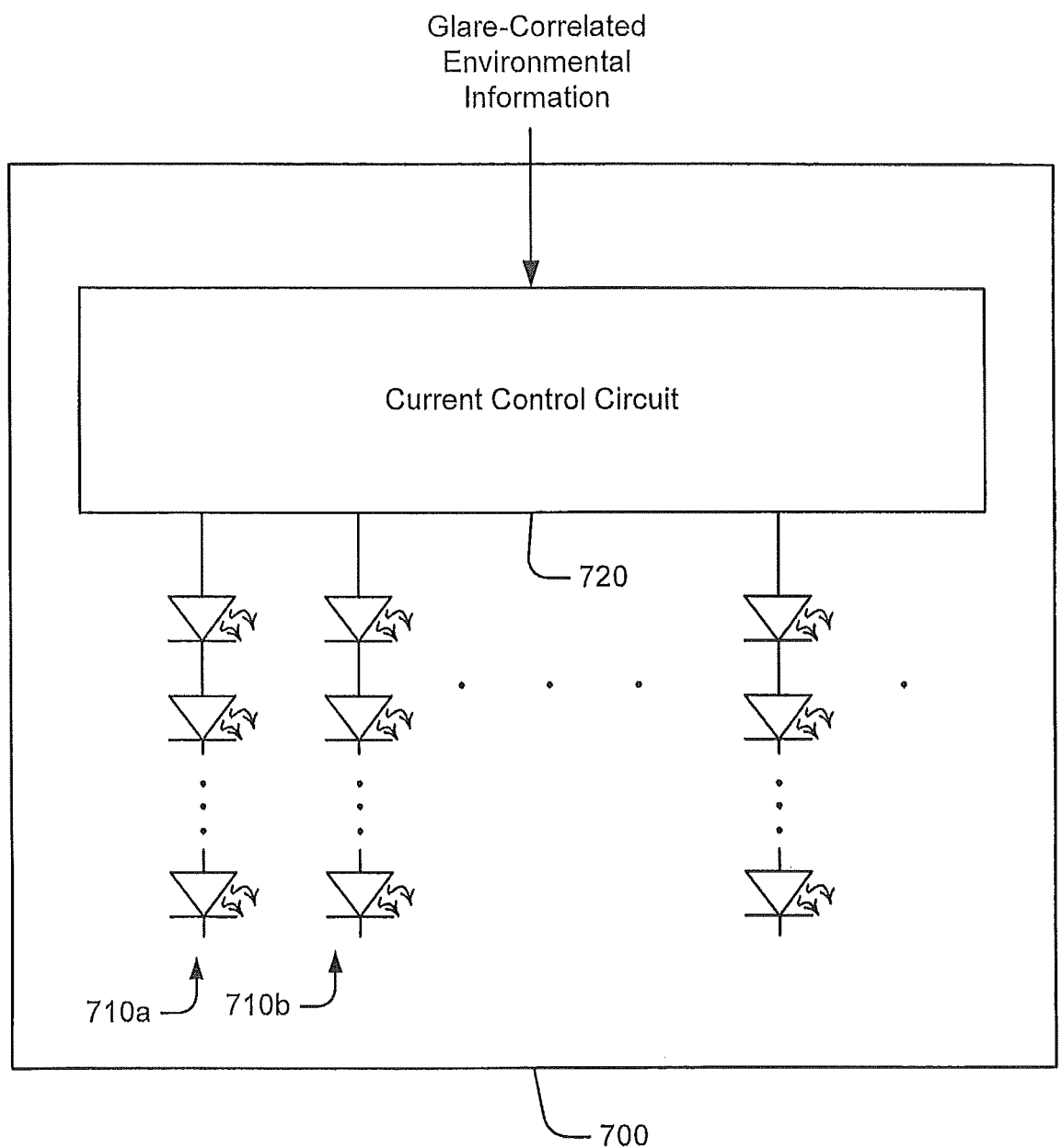
FIG. 7 illustrates color control in an LED lighting system according to some embodiments.

As noted above, embodiments of the inventive subject matter may be advantageously employed with LED lighting apparatus, as such devices may offer the ability to control color temperature in relatively straightforward and efficient manner. For example, as shown in FIG. 7, an LED lighting apparatus 700 may include a plurality of strings 710a, 710b, . . . , 710n of LEDs that produce different spectral (color) outputs. The apparatus 700 may include a current control circuit 720 configured to control respective currents in the strings 710a, 710b, . . . , 710n to control the spectral output (e.g., CCT) and/or other light output characteristics (e.g., CRI, lumen output, etc.) of the apparatus 700. In various embodiments, the strings 710a, 710b, . . . , 710n may have different colors, a subset of the strings 710a, 710b, . . . , 710n may have different colors, or the strings 710a, 710b, . . . , 710n may all be the same color. The control circuit 720 may be configured to control only one of the strings, a subset of strings, or all of the strings.

As shown, the current control circuit 720 may operate responsive to glare-correlated environmental information, which may include and/or be derived from reflected light sensors, weather sensors and/or weather information systems, as discussed above. Control of the strings 710a, 710b, . . . , 710n by the control circuit 720 may generally depend on the design of the lighting apparatus 700. For example, if only a subset of the strings 710a, 710b, . . . , 710n is used for controlling CCT, CRI, lumen output and/or other light output characteristics, the control circuit 720 may only need to control that subset. The control circuit 720 may be configured to control that subset collectively and/or to control individual strings within the subset.

Figure 8:
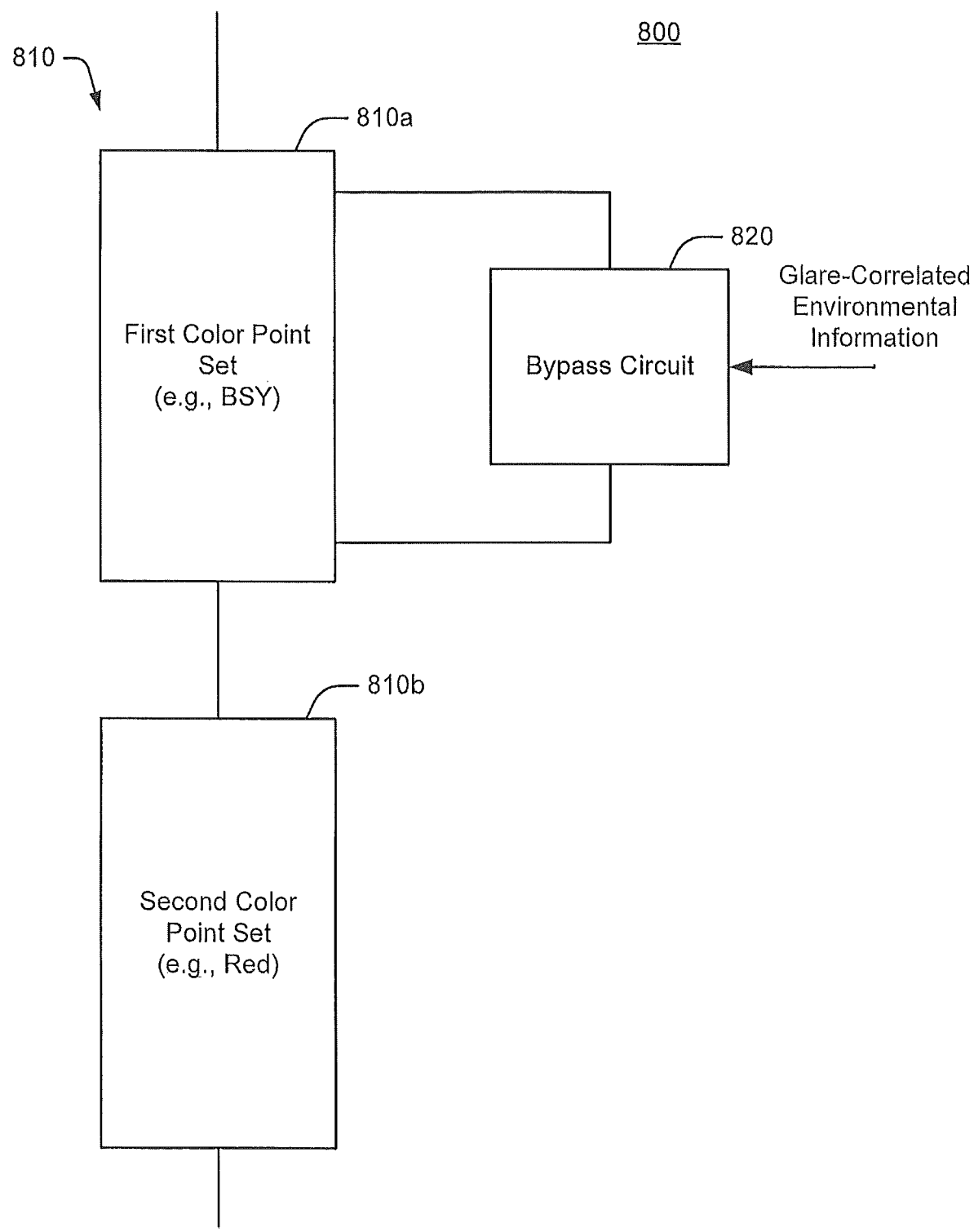
FIG. 8 illustrates color control in an LED lighting system according to further embodiments.

FIG. 8 illustrates another arrangement for color control in an LED apparatus 800 according to further embodiments. The lighting apparatus 800 includes a string 810 of LEDs, including a first set of LEDs 810a having a first color point (e.g., blue-shifted yellow (BSY)) and a second set of LEDs 810b having a second color point (e.g., red). The apparatus 800 may include at least one bypass circuit 820, which is configured to selectively bypass current around LEDs in the string 810 to produce a desired color output. As shown, the bypass circuit 820 may operate responsive to glare-correlated environmental information, which may include and/or be information derived from reflected light sensors, weather sensors and/or weather information systems. Various techniques for color control in LED lighting apparatus are described in U.S. Patent Application Publication No. 2009/0160363 to Negley et al. and U.S. Patent Application Publication No. 2012/030375 to van de Ven et al., the disclosures of which are incorporated herein by reference in their entirety.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. A system comprising:
    at least one lighting device; and
    a control circuit configured to
        receive an indication of glare from a reflected light sensor that receives reflected light from an area illuminated by the at least one lighting device, and
        vary a color temperature of light generated by the at least one lighting device based on the indication of glare, so as to reduce glare generated by the at least one lighting device.

2. The system of claim 1, wherein the control circuit is configured to lower the color temperature of the generated light based on the glare-correlated environmental information.

3. The system of claim 1, wherein the at least one lighting device comprises at least one outdoor luminaire.

4. The system of claim 1, wherein the at least one lighting device comprises a headlight of a vehicle and wherein the reflected light sensor is positioned on the vehicle.

5. The system of claim 1, wherein the at least one lighting device comprises at least one LED lighting device.

6. A system comprising:
    at least one LED luminaire;
    at least one reflected light sensor configured to sense reflected light from an area illuminated by the at least one LED luminaire; and
    a control circuit operatively coupled to the at least one LED luminaire and to the at least one reflected light sensor and configured to control a color temperature of illumination produced by the at least one LED luminaire responsive to the sensed reflected light,
    wherein the at least one reflected light sensor comprises a first sensor configured to sense reflected light from a first surface illuminated by the at least one lighting device and a second light sensor configured to sense reflected light from a second surface illuminated by the at least one lighting device; and
    wherein the control circuit is configured to determine a difference between the sense reflected light from the first and second surfaces and to control the color temperature of the illumination produced by the at least one LED luminaire responsive to the determined difference.

7. The system of claim 6, wherein the at least one reflected light sensor is positioned on a structure that supports the at least one LED luminaire.

8. The system of claim 6, wherein the at least one LED luminaire comprises a plurality of spaced-apart LED luminaires, wherein the at least one reflected light sensor comprises at least one reflected light sensor configured to sense reflected light from an area collectively illuminated by the plurality of LED luminaires, and wherein the control circuit is operatively coupled to the plurality of LED luminaires and configured to collectively control a color temperature of illumination produced by the plurality of LED luminaires.

9. The system of claim 6, wherein the at least one reflected light sensor is configured to sense light reflected directly from a surface illuminated by the at least one lighting device.

10. A method of operating a lighting system, the method comprising:
    sensing reflected light from an area illuminated by the lighting system; and
    controlling a color temperature of illumination produced by at least one lighting device of the lighting system responsive to the sensed reflected light,
    wherein sensing reflected light from an area illuminated by the lighting system the at least one reflected light sensor comprises sensing reflected light from a first surface illuminated by the lighting system and sensing reflected light from a second surface illuminated by the lighting system; and
    wherein controlling a color temperature of illumination produced by at least one lighting device of the lighting system responsive to the sensed reflected light comprises determining a difference between the sensed reflected light from the first and second surfaces and controlling the color temperature of the illumination produced by the lighting system responsive to the determined difference.

11. The method of claim 10, wherein sensing reflected light from an area illuminated by the lighting system comprises sensing the reflected light using at least one reflected light sensor positioned proximate the at least one lighting device.

12. The method of claim 10, wherein the at least one lighting device comprises at least one outdoor luminaire.

13. The method of claim 10, wherein the at least one lighting device comprises a headlight of a vehicle.

14. The method of claim 10, wherein the at least one lighting device comprises at least one LED lighting device.

15. The method of claim 10, wherein sensing reflected light from an area illuminated by the lighting system comprises sensing light reflected directly from a surface illuminated by the lighting system.

16. A system comprising:
  at least one lighting device; and
  a control circuit configured to
    receive an indication of precipitation from an environmental sensor, and
    vary a color temperature of light generated by the at least one lighting device based on the indication of precipitation, so as to reduce glare generated by the at least one lighting device,
    vary a color temperature of light generated by the at least one lighting device based on the indication of glare, so as to reduce glare generated by the at least one lighting device.

* * * * *